Feb. 13, 1962 H. MERKEL 3,021,196
METHOD FOR PRODUCING MULTI-COMPONENT SUBSTANCES
COMPRISING A COMPONENT OF HIGH VOLATILITY
Filed Sept. 6, 1956

United States Patent Office 3,021,196
Patented Feb. 13, 1962

3,021,196
METHOD FOR PRODUCING MULTI-COMPONENT SUBSTANCES COMPRISING A COMPONENT OF HIGH VOLATILITY
Hans Merkel, Erlangen, Germany, assignor to Siemens-Schuckertwerke Aktiengesellschaft, Berlin-Siemensstadt and Erlangen, Germany, a corporation of Germany
Filed Sept. 6, 1956, Ser. No. 608,334
Claims priority, application Germany Sept. 23, 1955
17 Claims. (Cl. 23—204)

This invention relates to an improvement in the Faraday method for producing multi-component substances which have the characteristic that, at the reaction temperature of the components, the partial vapor pressures of the respective components are considerably different from each other. In the Faraday method essentially only the components of lesser volatility are brought to the required reaction temperature, whereas the components of greater volatility are entirely or partially supplied in vapor phase. The components of greater volatility are separately heated in the sealed reaction vessel to such a temperature that their vapor pressure is equal to, or greater than, the partial pressure of these components obtaining at the reaction temperature above the melt of the compound to be produced. All other zones of the reaction vessel are so heated that a condensation of the components of greater volatility cannot occur at any part of the vessel.

The Faraday method has a number of disadvantages. Since the vapor pressure above the body of material of greater volatility placed on the floor of the processing vessel outside of the crucible which contains the component or components of lesser volatility is an exponential function of the temperature at the coldest spot of the sealed reaction vessel, this temperature must be maintained at very great accuracy in order to accurately predetermine the composition of the desired substance. The occurrence of excessive temperature may cause the vapor pressure to increase to such an extent that there is danger of explosion. If the component of greater volatility is an element which is polymorphous within the range of temperature to be employed, and if this element also exhibits a complicated conversion kinetic, it may be very difficult, and in some cases not feasible, to maintain an accurately defined vapor pressure within the reaction vessel when operating according to the Faraday method.

An object of this invention is to provide a method for the production of multi-component substances which obviates the said disadvantages of the Faraday method.

Another object of the invention is to provide a method which is applicable for the production of multi-component substances in which, at the reaction temperature of the components, the partial vapor pressure of at least one component is essentially higher than the partial vapor pressure of the other component, or components, and is also essentially higher than the partial pressure of a gaseous compound formed of these components.

This invention is an improvement in the modified Faraday process described in the co-assigned Welker et al. Patent 2,933,384, issued April 19, 1960.

The production of the multi-component substance according to the invention is carried out within a closed and sealed vessel system, and the component or components of greater volatility are supplied to the zone of reaction entirely or partially in the vapor phase. At least one substance containing the low-boiling component, or components, as a constituent is introduced into the sealed reaction vessel to serve as donor of the low-boiling component. The donor substance must satisfy the condition that the partial vapor pressure of said constituent at the reaction temperature is at least equal to the partial vapor pressure of the same low-boiling component, or components, in the multi-component substance to be produced.

This method is particularly advantageous in the manufacture of certain semiconducting $A_{III}B_V$ compounds or substances, namely compounds or multi-component substances composed of an element from the third group, second subgroup, of the periodic system of elements, with an element from the fifth group, second subgroup, of the system. The $A_{III}B_V$ substances are BN, BP, BAs, BSb, AlN, AlP, AlAs, AlSb, GaN, GaP, GaAs, GaSb, InN, InP, InAs, InSb. The method is furthermore of particular advantage for compounds in which the component or components of greater volatility comprises phosphorus, arsenic, sulphur, selenium or tellurium.

The method according to the invention will be further explained with reference to the manufacture of boron phosphide, BP. This example is of particular note because the temperature at which the boron reacts with the phosphorus is about 1,000° C. which is so far above the critical temperature of phosphorus that the vapor pressure of phosphorus would assume values which cannot be accommodated by means of the apparatus available for such purposes. The resultant difficulties, as well as those based upon the polymorphous character of phosphorus, are avoided by using for the formation of the phosphorus vapor phase, not elementary phosphorus, but rather the compound $CoP_3$. This compound is formed at 650° C. from cobalt and phosphorus and, at the above-mentioned reaction temperature of 1,000° C., is decomposed in accordance with the following equation.

$$CoP_3 \rightarrow CoP + 2P$$

During the conversion the vapor pressure of P on the equilibrium is approximately ½ atm. This pressure is sufficient for producing the reaction of the phosphorus vapor with the boron.

The drawing illustrates one form of apparatus which may be employed and further details of the method will be explained with reference thereto.

Figure 1:
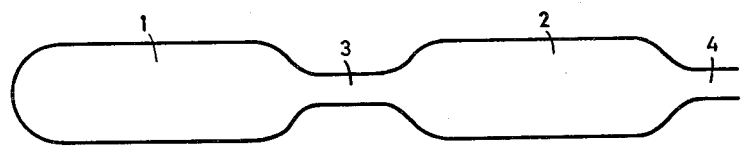
FIGURE 1 illustrates the apparatus as employed for step 1.

The method comprises three steps. In this first step the phosphorus donor substance $CoP_3$ is produced. The second step is the production of boron phosphide. The third step is the replenishing of phosphorus to the CoP resulting from donation of phosphorus from the donor $CoP_3$.

The first step will now be described:

The apparatus comprises a quartz vessel (FIG. 1) which has two portions, 1 and 2, connected with each other by a channel 3 of restricted cross-section. Weighed into the vessel portion 1 are 5.9 g. cobalt powder. Weighed into the vessel portion 2 are 8.4 g. red phosphorus. The vessel is then evacuated through the nipple portion 4 and is fused off and sealed at portion 4. Thereafter the entire apparatus is heated for 24 hours at 400° C. and for an additional 24 hours at 650° C. The vessel is then permitted to cool down to room temperature. After cooling the vessel portion 2 will be found empty and an amount of 14.3 g. of a mixture of $CoP_3$ powder and CoP powder will be found in vessel portion 1, the mixture having the cumulative composition $CoP_{2.7}$. The vessel is cut open at the constricted portion 3.

In this example the quantities of the components were so chosen that the phosphorus was not sufficient to convert the entire cobalt into $CoP_3$, so that a mixture $CoP_3/$CoP formed. This has the advantage that the entire amount of phosphorus, including the quantity contained within the gaseous phase, combines with the cobalt prior to the cooling period, so that after cooling no free phosphorus is contained within the vessel. Therefore the vessel can be opened without danger.

Figure 2:
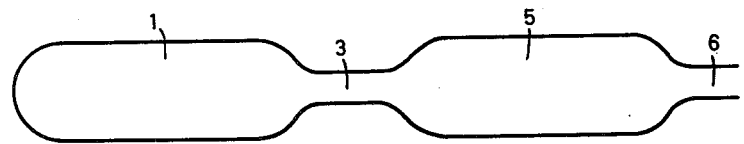
FIGURE 2 illustrates the apparatus as employed for step 2.

The second step will now be described:

As mentioned, the 14.3 g. $CoP_{2.7}$ is contained in the vessel portion 1 after termination of the first step of the process. Now, a vessel portion 5 (FIG. 2) containing 1 g. boron powder is fused to the vessel portion 1 at the constricted channel portion 3. The vessel is then evacuated through the nipple portions 6 and is fused off and sealed at nipple 6. The vessel is thereafter heated for about 24 hours to 1,000° C. to 1,050° C. This results in the formation of 3.87 g. boron phosphide (BP) in vessel portion 5. The product is subsequently subjected to tempering, which is done by heating the vessel for about 24 hours at 650° C. At 1,050° C. the phosphorus vapor pressure of the $CoP_3$ is approximately ½ atm.; at 650° C. this vapor pressure is immeasurably small.

During tempering at 650° C., the phosphorus vapor contained in the reaction vessel is reacted with or taken up by the CoP of the $CoP_3/CoP$ mixture which became depleted of $CoP_3$ during the donation of phosphorus. Consequently the amount of $CoP_3$ is replenished in the mixture from the phosphorus vapor phase. Therefore, the vessel does not contain free combustible phosphorus after the cooling period and can be opened without danger. It is sawed apart at vessel portion 3. The resulting boron phosphide is then located in the vessel portion 5, and the mixture $CoP_3/CoP$ is contained in the vessel portion 1.

The third step is as follows:

This step serves to reestablish the original composition of the $CoP_3/CoP$ mixture in accordance with the cumulative or summation formula $CoP_{2.7}$. As already mentioned, the vessel portion 1 now contains the mixture $CoP_3/CoP$ which is depleted in $CoP_3$. The vessel portion 2, which was used during the first step of the process, is now again fused to the vessel portion 1 at the intermediate portion 3; but the portion 2 is now provided with 2.9 g. red phosphorus. After evacuating through nipple 4, the nipple is fused off and sealed (FIG. 1). The vessel is then heated to about 650° C. for about 24 hours with the result that the $CoP_3/CoP$ mixture is converted back to the original formula $CoP_{2.7}$. It will be recognized that the original amount of cobalt can be used time and again as the basis for the P donor.

It will be understood from the above disclosure that the method is particularly applicable to, and advantageous for the high-temperature preparation of a stoichiometric compound with the aid of another stoichiometric compound serving as donor of a low boiling point component of the first compound.

According to another feature of my invention, the method described and exemplified above may be used to supply semiconductor substances with lattice defects, for the purpose of extrinsic conductance. For example, germanium can be doped with phosphorus lattice-defection atoms by proceeding as follows. A quantity of $CoP_3$ is weighed into the vessel portion 1, according to FIG. 1, and the vessel portion 2 is provided with the proper quantity of germanium. After evacuating the composite vessel, it is fused off and sealed at the nipple. Thereafter the vessel is heated with the effect that the germanium takes up phosphorus donor atoms from the gaseous phase of phosphorus. The number of the P-donor atoms thus taken up by the germanium during the heating period depends upon the temperature and the duration of the heating. All the precautions and details described above for making boron monophosphide are incorporated in this example by reference, including the use of a $CoP_3/CoP$ mixture and also the tempering step.

Aside from the above-mentioned advantages of the new method over the Faraday method, it will be recognized from the foregoing that the invention also presents the additional advantage that only one furnace and a correspondingly simplified equipment are needed.

The above described method was discovered in the course of efforts directed toward the production of boron phosphide (BP). Although the method can also be applied to other compounds, for instance those of the type $A_{II}B_{VI}$ its most important application is to $A_{III}B_V$ compounds containing low-boiling components, because this group of compounds is very difficult to manufacture by means of known methods.

Boron nitride (BN) is made by employing chromium nitride (CrN) as donor of the low boiling component (nitrogen). The formation of the BN then occurs at approximately the same temperature as the formation of the BP, that is at about 1000° C. The following quantitative reaction scheme is illustrative:

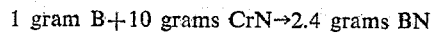

1 gram B + 10 grams CrN → 2.4 grams BN

As an instance of the manufacture of a compound not belonging to the group of $A_{III}B_V$ compounds, the production of beryllium sulphide (BeS) proceeds as follows. $CoS_2$ is used as the donor of the low-volatile sulphur, at a reaction temperature of approximately 1100° C. The following quantitative reaction scheme is illustrative:

1 gram Be + 15 grams $CoS_2$ → 4.5 grams BeS

I claim:

1. A process of preparing boron phosphide comprising separately heating cobalt and phosphorus in zones which communicate with each other and are otherwise sealed, the quantity of phosphorus being insufficient to convert all the cobalt into cobalt tri-phosphide, to produce a mixture of cobalt tri-phosphide and cobalt monophosphide, thereafter heating the said mixture and boron in a sealed chamber to form boron phosphide, under the superatmospheric pressure developed therein.

2. A process of preparing boron monophosphide comprising separately heating cobalt and phosphorus in zones which communicate with each other and are otherwise sealed, the quantity of phosphorus being insufficient to convert all the cobalt into cobalt tri-phosphide, to produce a mixture of cobalt tri-phosphide and cobalt mono-phosphide, thereafter separately heating the said mixture and boron in zones which communicate with each other and are otherwise sealed, at a temperature of about 1,000° C. to 1,050° C. to produce boron monophosphide, under the superatmospheric pressure developed therein, and subjecting the sealed reaction products to a heat tempering at about 650° C. to cause any phosphorus vapor formed in the latter heating to react with the resulting cobalt phosphide mixture which has become depleted in cobalt tri-phosphide.

3. The process as defined in claim 2 in which the seal is broken after the heat tempering operation, and thereafter separately heating the resulting cobalt phosphide mixture, and added phosphorus, in zones which communicate with each other and are otherwise sealed, to form a mixture of cobalt mono-phosphide and cobalt triphosphide and again reacting with boron as aforesaid to produce boron phosphide.

4. The process as defined in claim 3 in which the quantity of phosphorus is limited to no more than is required to produce a mixture of the compounds CoP and $CoP_3$ having the cumulative formula $CoP_{2.7}$.

5. A process for furnishing germanium with lattice defection atoms comprising separately heating germanium and cobalt tri-phosphide in zones which communicate with each other and are otherwise sealed, the germanium taking up phosphorus donor atoms from the gaseous phase of phosphorus produced by heating the cobalt tri-phosphide.

6. A process of preparing boron phosphide (BP) comprising reacting cobalt and phosphorus to produce cobalt triphosphide ($COP_3$), decomposing the latter to cobalt mono-phosphide and phosphorus vapor, and contacting the phosphorus vapor with boron in a sealed chamber to form boron phosphide under the superatmospheric pressure developed therein.

7. A process of preparing a compound of boron and phosphorus by reacting them together, comprising heating, in a first zone, boron in an atmosphere of phosphorus vapor to react them together, said atmosphere being produced by heating, in another communicating zone, a metal compound of phosphorus which compound decomposes to yield phosphorus, the partial vapor pressure of the phosphorus so yielded being at least equal to the partial vapor pressure of phosphorus in the compound being prepared, at the reaction temperature, the two zones forming a chamber which is at least sufficiently enclosed to prevent egress of phosphorus vapor, the reaction taking place under the superatmospheric pressure developed therein, the boron, phosphorus compound being allowed to cool down while in said chamber and in said atmosphere, to a temperature at which it is stable, said metal compound of phosphorus being one which can decompose to yield phosphorus at the temperature of the reaction.

8. A process of preparing an inorganic compound composed of phosphorus and an element having a partial vapor pressure lower than phosphorus taken from the third group, second sub-group of the periodic system, by reacting these components together, comprising heating in one zone said element in an atmosphere of phosphorus vapor to react them with each other, said atmosphere being produced by heating, in another communicating zone, a substance comprising a metal compound of the phosphorus which decomposes in the latter zone to yield phosphorus, the partial vapor pressure of the phosphorus so yielded being at least equal to the partial vapor pressure of phosphorus from the inorganic compound being prepared, at the reaction temperature, said communicating zones comprising a reaction enclosure which is at least sufficiently enclosed to prevent egress of phosphorus vapor, the reaction taking place under application of the pressure of the phosphorus vapor, the metal having a boiling point above the temperature of reaction, said inorganic compound being one which dissociates at the temperature of the reaction when heated at ordinary atmospheric pressure, the inorganic phosphorus compound being allowed to cool down to a stable temperature while in said enclosure, and in the phosphorus vapor, said metal compound of phosphorus being one which can decompose to yield phosphorus at the temperature of the reaction.

9. A process of preparing an inorganic material composed of substances whose partial vapor pressures at the temperature of the process are different from each other, by heating the substances together, comprising heating, in a first zone, the substance having the lesser partial vapor pressure in an atmosphere of the substance having the greater partial vapor pressure, to react them with each other, said atmosphere being produced by heating, in a second communicating zone, a stoichiometric compound of a metal and the substance having the greater partial vapor pressure, which compound decomposes in said second zone to yield the latter substance, the partial vapor pressure of the latter substance so yielded being at least equal to the partial vapor pressure of the same substance of the inorganic material being prepared, at the temperature that the latter material is heated to in the first zone, said communicating zones comprising a reaction enclosure which is at least sufficiently enclosed to prevent egress of phosphorus vapor, the reaction taking place under application of the pressure of the vapor of the substance having the higher partial vapor pressure, the metal having a boiling point higher than the temperature in said second zone, said inorganic material being an $A_{III}B_V$ multicomponent semiconductor material, which dissociates at the temperature of the reaction when at atmospheric pressure, the $A_{III}B_V$ material being allowed to cool down to a temperature at which it is stable, while in said enclosure and in said atmosphere, said stoichiometric compound being one which can decompose to yield the substance of greater partial vapor pressure at the temperature of the reaction.

10. A process of preparing an inorganic compound composed of phosphorus and an element having a partial vapor pressure lower than phosphorus taken from the third group, second sub-group of the periodic system, by reacting these components together, comprising heating in one zone said element in an atmosphere of phosphorus vapor to react them with each other, said atmosphere being produced by heating a substance comprising cobalt triphosphide in another communicating zone, the partial vapor pressure of the phosphorus so yielded being at least equal to the partial vapor pressure of phosphorus from the inorganic compound being prepared, at the reaction temperature, said communicating zones comprising a reaction enclosure which is at least sufficiently enclosed to prevent egress of phosphorus vapor, the reaction taking place under application of the pressure of the phosphorus vapor, the inorganic phosphorus compound being allowed to cool down, while in said enclosure, and in said phosphorus vapor, to a temperature at which it is stable.

11. A process of preparing an inorganic compound composed of phosphorus and an element having a partial vapor pressure lower than phosphorus taken from the third group, second sub-group of the periodic system, by reacting these components together, comprising heating, in one zone, said element in an atmosphere of phosphorus vapor to react them with each other, said atmosphere being produced by heating, in another communicating zone, a substance comprising a metal compound of the phosphorus which decomposes in the latter zone to yield phosphorus, the partial vapor pressure of the phosphorus so yielded being at least equal to the partial vapor pressure of phosphorus from the inorganic compound being prepared, at the reaction temperature, said communicating zones comprising a reaction enclosure which is at least sufficiently enclosed to prevent egress of phosphorus vapor, the reaction taking place under application of the pressure of the phosphorus vapor, said substance being composed of both cobalt triphosphide and cobalt monophosphide, triphosphide and cobalt monophosphide, said inorganic compound being one which dissociates at the temperature of the reaction when heated at ordinary atmospheric pressure, the inorganic phosphorus compound being allowed to cool down, while in said enclosure, and in said phosphorus vapor, to a temperature at which it is stable.

12. The process defined in claim 9, the $A_{III}B_V$ semiconductor material being one in which B is phosphorous, which is said more volatile component.

13. The process defined in claim 9, the $A_{III}B_V$ semiconductor material being one in which B is arsenic, which is said more volatile component.

14. The process defined in claim 9, the $A_{III}B_V$ semiconductor material being one in which B is nitrogen.

15. The process defined in claim 9, the $A_{III}B_V$ semiconductor material being one in which B is phosphorous, which is said more volatile component, the temperature of the reaction and the temperature of heating the said stoichiometric compound being substantially the same.

16. The process defined in claim 7, the temperature of the reaction and the temperature of the decomposition of the metal compound of phosphorous being substantially the same.

17. The process of claim 9 in which the inorganic material prepared is boron nitride (BN) and the stoichiometric compound is chromium nitride (CrN).

(References on following page)

References Cited in the file of this patent

UNITED STATES PATENTS

| | | |
|---|---|---|
| 938,634 | Betts | Nov. 2, 1909 |
| 1,565,595 | Snelling | Dec. 15, 1925 |
| 2,161,746 | Pearson | June 6, 1939 |
| 2,490,851 | Alexander | Dec. 13, 1949 |
| 2,530,110 | Woodyard | Nov. 14, 1950 |
| 2,798,989 | Welker | July 9, 1957 |
| 2,871,100 | Guire et al. | Jan. 27, 1959 |

FOREIGN PATENTS

| | | |
|---|---|---|
| 483,406 | Great Britain | Apr. 20, 1938 |

OTHER REFERENCES

Biltz et al.: "Zeitschrift für Anorganische und Allgemeine Chemie," vol. 241, p. 349 (1939).

Pietsch et al.: "Chemical Abstracts," vol. 28, p. 6647 (1932).

Moeller: "Inorganic Chemistry," 1952, p. 859.

Kirk-Othmer: "Encyclopaedia of Chemical Technology," 1948, vol. 2, p. 508.

Baur et al.: "Zeitschrift für Physikalische Chemie," vol. 52, pp. 473–475 (1905).

Hurd: "Chemistry of the Hydrides," 1952, p. 26.

White et al.: "Journal of the American Chemical Society," vol. 66, pages 1666–1672 (October 1944).